Jan. 7, 1969    F. F. LIU ET AL    3,421,077
DENSITY MEASUREMENT DEVICE FOR CRYOGENIC FLUIDS
AND OTHER NON-POLAR FLUIDS
Filed Sept. 24, 1963

FREDERICK F. LIU
TED W. BERWIN
    INVENTOR.

BY  R. E. Geauque
    ATTORNEY

Jan. 7, 1969　　　　　　　F. F. LIU ETAL　　　　　3,421,077
DENSITY MEASUREMENT DEVICE FOR CRYOGENIC FLUIDS
AND OTHER NON-POLAR FLUIDS
Filed Sept. 24, 1963

FREDERICK F. LIU
TED W. BERWIN
    *INVENTOR.*

BY  *R. E. Geangue*
    ATTORNEY

United States Patent Office 3,421,077
Patented Jan. 7, 1969

3,421,077
DENSITY MEASUREMENT DEVICE FOR CRYOGENIC FLUIDS AND OTHER NON-POLAR FLUIDS
Frederick F. Liu, Northridge, and Ted W. Berwin, Arlington, Calif., assignors to Quantum Dynamics, Inc. (Elastronics Laboratories Division), Tarzana, Calif., a corporation of California
Filed Sept. 24, 1963, Ser. No. 311,182
U.S. Cl. 324—61                    3 Claims
Int. Cl. G01r 27/26

This invention relates to a density measuring device, and more particularly to a device capable of accurately measuring the density of a cryogenic fluid by accurate sensing of the fluid's dielectric properties.

The mass flow of a fluid can be determined by measuring its volume flow and applying a density factor to the volume measurement. In most applications, an average density is adequate and separate measurement of density is not required. However, in a propulsion system using a cryogenic propellant, such as liquid hydrogen, the density of the cryogenic propellant under steady or transient flow conditions is an important parameter relating to the performance and reliability of the system. Thus, high accuracy of instantaneous density measurement is often required.

The density of a cryogenic fluid in the liquid phase, such as liquid hydrogen, is primarily a function of temperature, and to a lesser extent, of pressure. This relationship, however, is no longer valid if the fluid is in its vapor or super-critical state. The quality of the cryogenic fluid thus becomes an additional consideration, since cavitation and vapor can substantially alter the overall density value. The present invention provides a direct density measurement device capable of continuously measuring true density under such diverse conditions. Generally, the invention accurately senses the fluid's dielectric properties and electronically computes density from the Clausius-Mossotti equation which relates dielectric constant to the density. Accurate and direct measurement of density is thus accomplished by this relationship which is essentially independent of the temperature, pressure, and the vapor presence and, therefore, the range of application of the invention can be extended to mixtures of fluids other than pure liquids.

It is therefore an object of the present invention to provide a density measurement device which arrives at the density of a substance by sensing the dielectric constant of the substance and computing the density therefrom.

Another object of the invention is to provide a density measurement device which rigorously computes density from measured dielectric constant by using the equation relating dielectric constant to density.

Another object of the invention is to provide a density measurement device capable of sensing the dielectric constant of a fluid substance or mixture and thereafter electronically computing density by rigorous solution of the Clausius-Mossotti equation.

These and other objects of the invention not specifically set forth above, will become readily apparent from the accompanying description and drawings in which.

Figure 1:
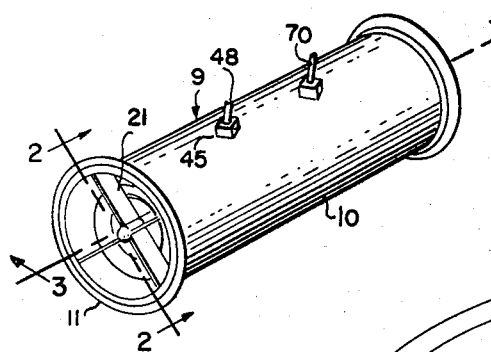
FIGURE 1 is a perspective view of a flow measuring instrument incorporating the present invention.
Figure 2:
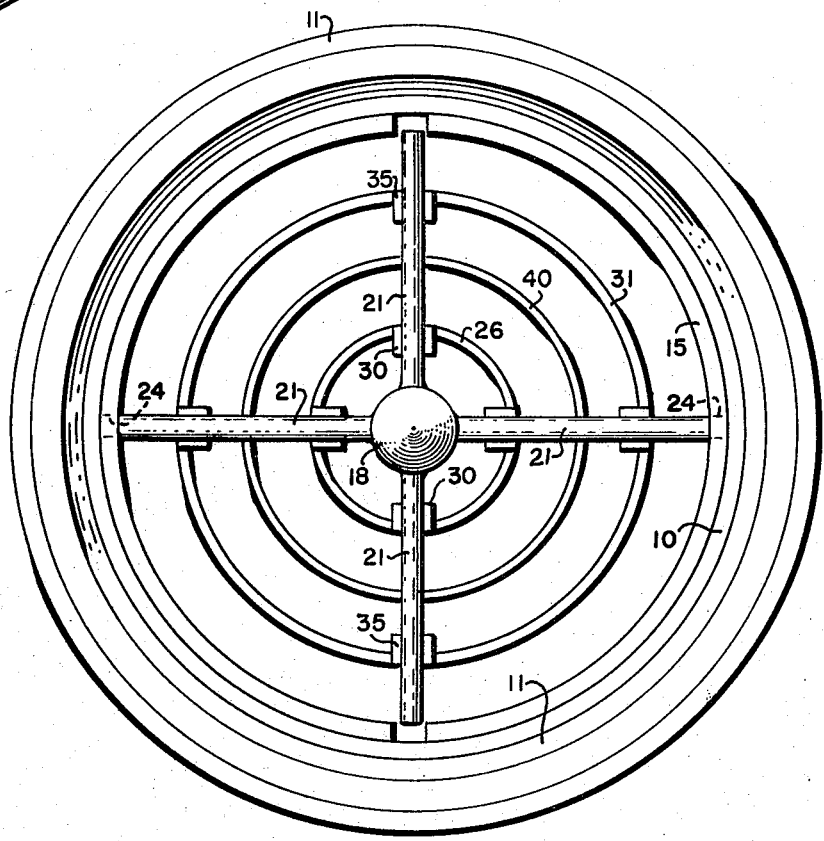
FIGURE 2 is a front elevational view along line 2—2 of FIGURE 1 showing a capacitor positioned in the flow conduit to obtain a measure of dielectric constant.
Figures 3, 5:
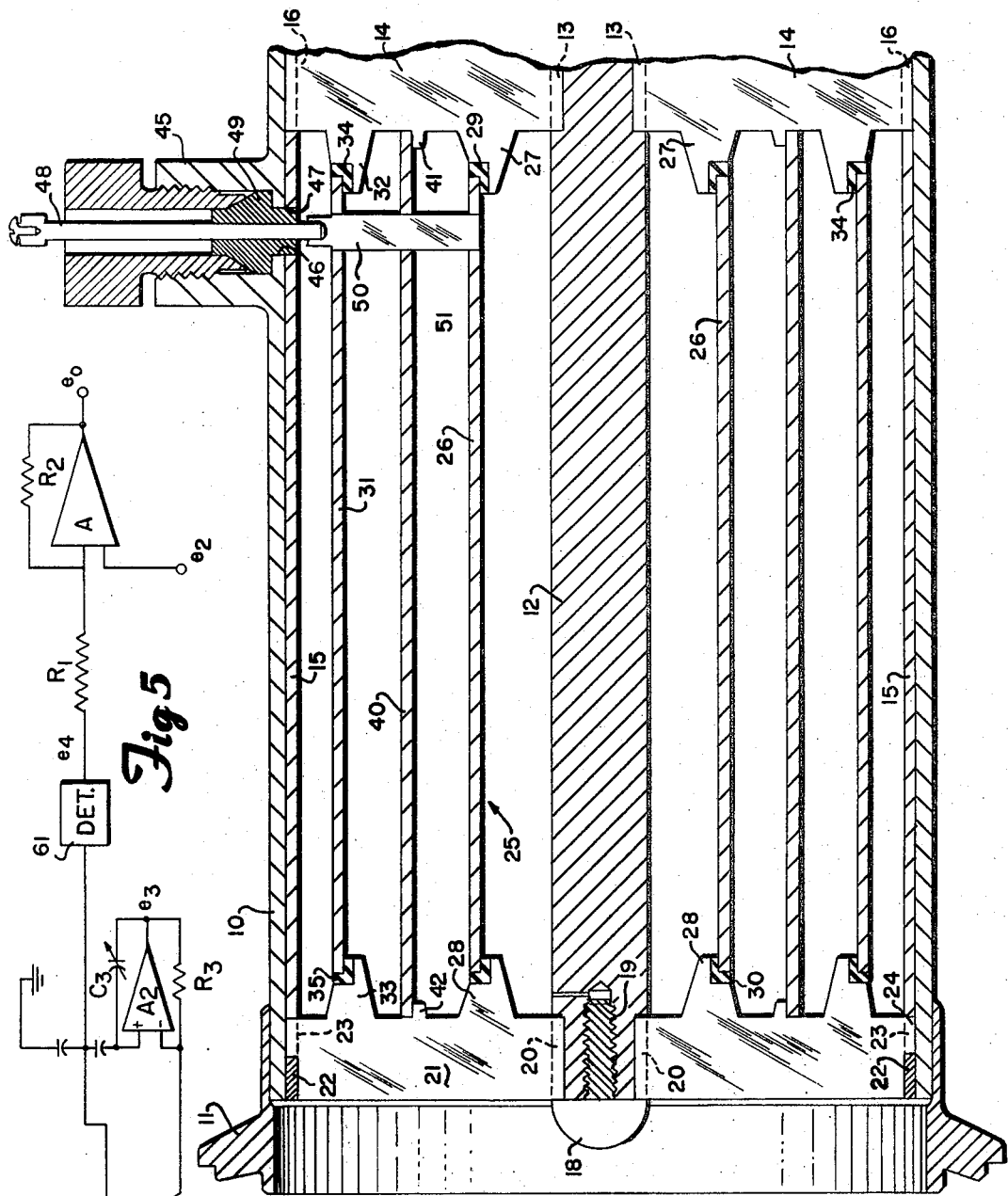
FIGURE 3 is a sectional view along line 3—3 of FIGURE 1 showing the coaxial cylinders of the measuring capacitor.
FIGURE 5 is a schematic circuit of a second form of the invention.

Referring to FIGURES 1–3, flowmeter 9 has a fluid conduit 10 provided with a flange 11 for attachment to a passage (not shown) containing a substance whose density is to be measured. In the case of a propulsion system, the fluid passage 10 could be placed in a propellant line to measure the flow of a cryogenic substance, such as hydrogen consisting of a mixture of liquid and vapor. The conduit 10 contains a central shaft 12 which has four slots 13 for receiving the inner ends of radial vanes 14. A support sleeve 15 is located at the inner surface of conduit 10 and has slots 16 for receiving and securing the outer ends of the vanes 14. A hub member 18 is secured by threaded member 19 to the upstream end of shaft 12 and contains four slots 20 for receiving the inner ends of four radial vanes 21. Ring 22 serves to retain sleeve 15 within conduit 10 and the sleeve has four end slots 23 for receiving and securing the tabs 24 on the outer ends of vanes 21. The four vanes 14 and the four vanes 21 are spaced 90 degrees apart and serve to support a capacitor 25 comprising a plurality of coaxial cylindrical elements located at the entrance to conduit 10. Cylinder 26 is supported by arms 27 of vanes 14 and by arms 28 of vanes 21 and is insulated therefrom by L-shaped insulating rings 29 and 30. In a similar manner, cylinder 31 is supported by arms 32 of vanes 14 and by arms 33 of vanes 21 and is insulated therefrom by L-shaped insulating rings 34 and 35. An intermediate cylinder 40 is secured directly to projections 41 on vanes 14 and to projections 42 on vanes 21.

The conduit 10 has a circular extension 45 connecting with an opening 46 in conduit 10 and an opening 47 in sleeve 15. A lead 48 for capacitor 25 extends through seal 49 located in openings 46 and 47 and in extension 45 and a lock 45a is threaded into extension 45 to compress and secure the seal 49. The end of the lead 48 is connected by connector 50 to cylinder 26 and passes through opening 51 in cylinder 40 to also connect with cylinder 31. The sleeve 15, cylinder 40 and shaft 12 are all grounded so that capacitor 25 consists of a plurality of cylindrical capacitance elements connected together in parallel and distributed across the flow passage of conduit 10 to detect an average value of the dielectric constant of the fluid between the elements. The capacitor can have a number of configurations and does not have to be limited to coaxial cylinders. For instance, parallel condenser plates can also be used.

The capacitor 25, which is immersed in the cryogenic fluid flowing into conduit 10, has a variable dielectric constant which depends upon the quantities of vapor and liquid making up the flowing cryogenic fluid. The relationship between dielectric constant and density is governed by the well-known Clausius-Mossotti equation as follows:

$$\rho = K\left(\frac{\epsilon-1}{\epsilon+2}\right) = \frac{nM}{N}$$

where $\rho$ = density (gm./cu.cm.)
$\epsilon$ = dielectric constant of cryogenic substance with respect to dielectric constant of vacuum (dimensionless)
$K$ = constant determined by properties of cryogenic substance (gm./cu. cm.) (equals $3M/4\pi N\alpha$)
$n$ = number of molecules per cu.cm.
$M$ = molecular weight (gm.)
$N$ = universal constant ($6.02 \times 10^{23}$)
  = number of molecules in a gram molecular weight of any substance
$\alpha$ = polarizability of the molecule (cm.$^3$)

The above equation applies accurately to all nonpolar liquids and gases. The constant K is determined by the properties of particular nonplar liquids.

The present invention consists of a high precision sensor for determining the dielectric constant for capacitor 25 and of a small analog computer for converting the dielectric constant into a value of density. The output of the computer is such that $$e_0 = k_1\rho = \bar{k}_2\left(\frac{\epsilon-1}{\epsilon+2}\right)$$

where $e_0$ = output voltage (volts)
$k_1$ = conversion constant $$= 1\left(\frac{\text{volts}}{\text{lbs./cu. ft.}}\right)$$

$k_2$ = second conversion constant = 63.3 lbs./ft.³ for hydrogen
$\rho$ = density (lbs./cu.ft.)
$\epsilon$ = dielectric constant of cryogenic fluid with respect to the dielectric constant of vacuum (dimensionless)

Figure 4:
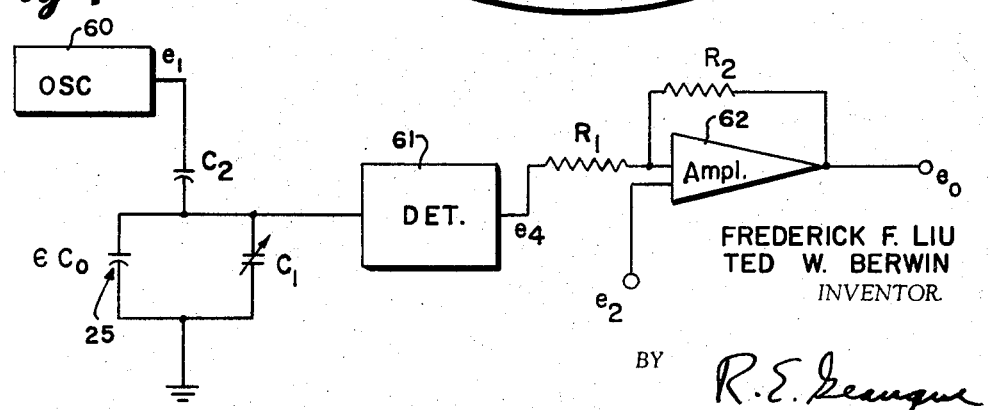
FIGURE 4 is a schematic circuit of the present invention incorporating the measuring capacitor and computer.

A circuit for making the above computation is shown in FIGURE 4. The oscillator 60 whose frequency is approximately 2.5 mc. has a peak-to-peak amplitude of $e_1$ and this voltage is applied to a capacitive network consisting of $C_0$, $C_1$ and $C_2$. The measuring capacitance $C_0$ represents the capacitor 25 forming the portion of the capacitance network which is affected by the dielectric constant of the cryogenic fluid flowing in conduit 10. Capacitance $C_1$ is a trimmer adjustment capacitor representing the cable capacitance and is unaffected by the dielectric constant of the flowing cryogenic fluid. The capacitance $C_1$ can be trimmed to match the absolute capacitance of capacitance $C_0$.

The detector 61 converts the peak-to-peak amplitude of the voltage across capaictor 25 and capacitance $C_1$ to a D–C level, and has a gain "$a$" of just under unity. This D–C voltage output $e_4$ of detector 61 is applied to one input terminal of amplifier 62. At the other input terminal of the amplifier, voltage $e_2$ is applied as a fixed potential. The gain of the amplifier is determined by the value of the precision resistors $R_1$ and $R_2$. Since the capacitor 25 is connected in parallel with capacitance $C_1$, the input to detector 61 is the sum of these capacitances and will vary with the dielectric constant $\epsilon$.

It can be shown from circuit theory that $e_0$ is given by:

$$e_0 = e_2\left(1+\frac{R_2}{R_1}\right)\left[\frac{\epsilon + \frac{C_1+C_2}{C_0} - \frac{R_2}{R_1+R_2}\left(\frac{ae_1}{e_2}\right)\left(\frac{C_2}{C_0}\right)}{\epsilon + \frac{C_1+C_2}{C_0}}\right]$$

As previously stated, the present invention achieves a relationship which establishes the Clausius-Mossotti equation and for liquid hydrogen, the circuit can achieve a relationship whereby $$e_0 = 63.3\left(\frac{\epsilon-1}{\epsilon+2}\right)$$

Thus, output $e_0$ of the circuit of FIGURE 3 can become a direct indication of liquid hydrogen density when proper values of resistance and capacitance are inserted in the circuit. In order to convert the above circuit equation into the equation for liquid hydrogen, the following simple algebraic manipulations are made $$A = \frac{C_1+C_2}{C_0}; \quad B = \frac{R_2}{R_1+R_2}\left(\frac{ae_1}{e_2}\right)\left(\frac{C_2}{C_0}\right)$$

So that $$e_0 = e_2\left(1+\frac{R_2}{R_1}\right)\left[\frac{\epsilon+A-B}{\epsilon+A}\right]$$

Since it is required to have $A = +2$ and $A - B = -1$ in order to satisfy the relationship, then B must be equal to 3.

Now, by letting $e_2 = 1.625$ volt
$R_1 = 10K$ ohm
$R_2 = 380K$ ohm and $$ae_1 = 5\left(\frac{C_0}{C_2}\right); \quad \frac{C_1+C_2}{C_0} = 2$$

and by adjusting $C_1$ for null output when $E\epsilon = 1$ (in other words, making $C_1 = C_0$), the basic equation for the circuit of FIGURE 3 is reduced to the exact form of $$e_0 = 63.3\left(\frac{\epsilon-1}{\epsilon+2}\right)$$

which is the equation for liquid hydrogen. Thus, $e_0$ gives directly the liquid hydrogen density according to the exact Clausius-Mossotti equation. The density value $e_0$, for instance, can be read out directly by a meter, or on a digital voltmeter. Referring to FIGURE 1, the lead 70 can be attached to a conventional pickup to detect the speed of rotation of the rotor of a volume flowmeter located just downstream of the capacitor 25 and the value of $e_0$ can be combined with the turbine speed signal by well-known circuitry to obtain an instantaneous value of mass flow. An example of other values used in the circuit of FIGURE 3 is $C_0 = 85$ pf.; $C_1 = 85$ pf. (adjusted); $C_2 = 115$ pf.; and $e_1 = 12$ volts peak to peak.

For other cryogenic fluids, only the constants of proportionality K and $\bar{k}_2$ change and the values of resistance and capacitance in the circuit can be selected to produce an output $e_0$ representing the density of another cryogenic fluid. Examples of computed constants $\bar{k}_2$ for various cryogenic fluids are given in the table below:

| Cryogenic fluid | $\bar{k}_2$, lbs./ft.³ | Applicable temperature range (° K.) |
|---|---|---|
| Liquid hydrogen | 63.3 | 15–20 |
| Liquid nitrogen | 383 | 74–100 |
| Liquid helium | 495 | 2.6–4.0 |
| Liquid oxygen | 515 | 65–90 |

FIGURE 5 shows a modification of the invention which eliminates the effect due to $C_1$ so that precise density measurement can be obtained using longer cable lengths. For this purpose, a negative capacitance circuit element is added to the basic circuit of FIGURE 3. An adjustable resistor $R_4$ is connected between amplifier $A_2$ and ground and the amplifier output $e_3$ is fed back through resistor $R_3$ and through negative capacitance $C_3$ which is also coupled to the input to detector 61 to cancel out the effect of $C_1$. The mathematical relationship for the modified circuit is written as follows:

$$e_4 = \frac{ae_1\left(\frac{C_2}{C_1}\right)}{\epsilon + \frac{C_1+C_2-C_3}{C_0}}$$

and $$e_0 = e_2\left(1+\frac{R_2}{R_1}\right)\left[\frac{\epsilon+\left(\frac{C_1+C_2-C_3}{C_0}\right)-\left(\frac{R_2}{R_1+R_2}\right)\left(\frac{ae_1}{e_2}\right)\frac{C_2}{C_0}}{\epsilon+\frac{C_1+C_2-C_3}{C_0}}\right]$$

When the value of $C_0$ is small, $e_0$ can still be solved with accuracy if $C_1+C_2-C_3$ is made comparatively small. Making the following manipulations $$\frac{C_1+C_2-C_3}{C_0} = 2 \text{ and } ae_1\left(\frac{C_2}{C_0}\right)\left(\frac{R_2}{R_1+R_2}\right) = 5$$

then $$e_0 = e_2\left(1+\frac{R_2}{R_1}\right)\left(\frac{\epsilon-1}{\epsilon+2}\right)$$

and this equation can again be made into $$e_0 = 63.3 \left( \frac{\epsilon-1}{\epsilon+2} \right)$$

which is the form for liquid hydrogen. $C_3$ can be made to cancel out $C_1$ or $C_2$ thus permitting the use of longer cable length for the precise measurement of the cryogenic density.

The circuit arrangement shown in FIGURE 5 follows essentially the same principle as the circuit shown in FIGURE 4. The additional features are that operational amplifier $A_2$, the capacitor $C_3$, resistor $R_3$, and its adjusting potentiometer $R_4$ form the negative capacitance network. The amount of negative capacitance, which is required to cancel out the cable effect, is adjusted by means of the adjustable resistor $R_4$ which is connected in series with $R_3$. This adjustable resistor $R_4$ also serves to set the "span" for full-scale measurement in conjunction with capacitor $C_3$. For instance, the density of liquid hydrogen may range from 4.383 to 4.82 lb./cu. ft., so that the device could be set for the full-scale operation range from 0 to 5 lb./cu. ft. The function of the negative capacitance network is to create, through proper adjustment of $R_4$, a value for $C_3$ which is equal and opposite in sign to $C_1$ which is the cable capacitance. By doing so, the cable effect can be cancelled out and all the $C_3$ and $C_1$ terms can be dropped from the mathematical equations. The equations are thus simplified and the accuracy and resolution in measuring $\epsilon C_0$, therefore, can be improved.

A negative capacitance is an electronic circuit element or elements which behave like negative capacitance. More specifically, when a capacitor, such as the capacitor $C_3$ shown in FIGURE 5, is connected between the input and the output of the amplifier $A_2$, if the amplifier has a gain greater than $+1$ and the amplifier is operating in a positive feed back arrangement, if the circuit is looked at from its input side, its behavior is analogous to that of a negative capacitor.

While the invention is particularly useful in continuously measuring the density of a single-phase or two-phase cryogenic fluid, it can also be utilized for the measurement of density of condensed gases or other nonpolar fluids in a state in which the density is difficult to estimate. Various types of condensers can be utilized in the fluid to obtain a capacity measurement from which density can be computed, and in cryogenic fluids it is desirable to have the measuring condenser as close as possible to the turbine for the volume flowmeter since the state of the fluid can change as it flows in a conduit. Other modifications are contemplated by those skilled in the art without departing from the spirit and scope of the invention as hereinafter defined by the appended claims.

What is claimed is:

1. A device for measuring the density of a fluid comprising:
   an oscillator;
   a capacitive network connected with said oscillator and comprising a first measuring capacitor located in said fluid to form a portion of the network affected by the dielectric constant of the fluid and a second adjustable capacitor connected in parallel with said first capacitor;
   means for converting the peak-to-peak amplitude of the voltage across said first capacitor to a corresponding D-C voltage level;
   computer means receiving said D-C voltage and electrically solving the Clausius-Mossotti equation to obtain a voltage proportional to the density of said fluid; said Clausius-Mossotti equation being $$\rho \text{ (density)} = \bar{k}_2 \frac{\epsilon-1}{\epsilon+2}$$

where $K_2$ is a constant whose value depends upon the nature of said fluid and $\epsilon$ is the dielectric constant of said fluid;
   said computing means comprising:
   an operational amplifier having first and second input terminals and connected with said D-C voltage at said first input terminal through a resistor;
   a fixed voltage input connected with said second input terminal of said amplifier; and
   a feedback line between said output voltage and said first input terminal and containing a second resistance.

2. A device for measuring the density of a fluid comprising:
   an oscillator;
   a capactive network connected with said oscillator and comprising a first measuring capacitor located in said fluid to form a portion of the network affected by the dielectric constant of the fluid and a second adjustable capacitor connected in parallel with said first capacitor;
   means for converting the peak-to-peak amplitude of the voltage across said first capacitor to a corresponding D-C voltage level;
   computer means receiving said D-C voltage and electrically solving the Clausius-Mossotti equation to obtain a voltage proportional to the density of said fluid; said Clausius-Mossotti equation being $$\rho \text{ (density)} = \bar{k}_2 \frac{\epsilon-1}{\epsilon 2}$$

where $K_2$ is a constant whose value depends upon the nature of said fluid and $\epsilon$ is the dielectric constant of said fluid; and
   a negative capacitance circuit element connected in parallel with said first and second capacitors for eliminating the effect of said second capacitor.

3. A device as defined in claim 2 wherein said negative capacitance circuit element comprises a second amplifier having positive and negative input terminals and an output terminal and having a variable resistor connected between said negative terminals and ground and a feedback resistor connected between said output terminal and said negative terminal, said positive terminal being connected to said output terminal by a feedback line containing a variable capacitor, said positive terminal being condenser coupled to a terminal point in the line leading to said converter means, said terminal point also being condenser coupled to ground.

References Cited

UNITED STATES PATENTS

| 2,519,668 | 8/1950 | Konigsberg | 324—60 X |
| 2,800,628 | 7/1957 | Stinson et al. | 324—61 |
| 2,882,728 | 4/1959 | Zito | 324—61 X |
| 2,934,700 | 4/1960 | Holaday et al. | 324—61 |
| 2,935,681 | 5/1960 | Anderson | 324—61 |
| 2,992,392 | 7/1961 | Haynes | 324—61 |
| 3,048,775 | 8/1962 | Calvert | 324—61 |
| 3,167,959 | 2/1965 | Johnson | 73—304 |
| 3,176,222 | 3/1965 | Atkinson | 324—61 |

OTHER REFERENCES

Malmstadt et al., Electronics for Scientists, W. A. Benjamin Inc., New York, 1962, TK 7815 M25, pp. 353–355.

RUDOLPH V. ROLINEC, *Primary Examiner.*

E. E. KUBASIEWICZ, *Assistant Examiner.*